July 6, 1965

C. L. CLOCK 3,192,976

METHOD OF AND DEVICE FOR SEMIDIVIDING BAKERY GOODS

Filed July 8, 1960

Charles L. Clock
INVENTOR.

BY Ramsey and Kolisch
Attys.

3,192,976
METHOD OF AND DEVICE FOR SEMIDIVIDING BAKERY GOODS
Charles L. Clock, Rte. 2, Box 214, Sherwood, Oreg.
Filed July 8, 1960, Ser. No. 41,676
12 Claims. (Cl. 146—241)

This invention relates to apparatus for partially dividing bakery goods such as muffins, buns, and the like, whereby they may be easily completely broken apart along a plane prior to their eating.

With a bakery item such as an English muffin, it is common to divide the muffin along a plane that substantially parallels its bottom to prepare it for applying a spread thereover. Bakeries have sold buns and muffins partially, or completely divided along such a plane, however, techniques employed in the past to divide the buns and muffins have not been entirely satisfactory. Principal disadvantages have included difficulty in handling goods that are completely cut in two, and a tendency for such bakery goods, whether completely divided or semidivided, to become stale and dry within a short time. The shelf life of a muffin that has been cut in two is considerably less than the shelf life of a muffin that is whole.

A general object of this invention is to provide novel apparatus for partially dividing goods, such as muffins and buns, that is operable to process such items in such a manner that they may be easily torn apart when desired, without materially affecting their shelf life.

According to this invention, the flexible and resilient character of a freshly baked muffin (or bun), and the skin that normally surrounds the muffin, is relied upon to produce a form of seal that effectively prevents drying and hardening of the muffin interior. Semiseparation of a muffin is produced by puncturing it from the sides with elongated piercing fingers, that are moved into and out of the muffin by moving the fingers lengthwise with a minimal amount of lateral shifting and twisting in the fingers. Elongated penetrations result, that are cuts, with substantially no tearing or fraying of the muffin. When a piercing finger withdraws from a muffin, the outer skin of the muffin, which originally was indented inwardly under the urging of inward movement of a finger, tends to return to its original position flush with the muffin sides. The skin, since it is cut and not frayed on returning to this flush position, tends to seal the cut produced by the finger and closes off the interior of the muffin. The muffin may then be suitably packaged, and it has been found that when it is subsequently torn open along the plane of semidivision made by the fingers, the inside of the muffin is fresh and soft. The penetrations enable separation of the muffin along an even plane, without the muffin ripping off at the edges.

Thus, it is a more specific object of the invention to provide improved apparatus for partially dividing muffins, buns, and the like, which comprises a series of elongated piercing fingers mounted in a novel manner, whereby they may, by mechanical means, be thrust into and out of a muffin or bun as the same is passed along a confined path, with insignificant tearing of the muffin sides and interior.

Another object is to provide apparatus which includes guide means defining an elongated passage for such bakery goods, and cutter means along each side of said passage, each comprising plural fingers spaced apart and mounted to be advanced into and then be withdrawn from a bakery good as it travels along said passage. The apparatus produces self-sealing punches inwardly from opposite sides of a bun or muffin.

Another object is to provide a novel type of cutter means, which includes plural fingers mounted on an elongated, continuous chain run, with a portion of the chain run extending in an arcuate reach along side means defining a confined passage for the travel of muffins or buns. The inner ends of fingers secured to the chain along this reach define a sweep that extends into and then withdraws from said passage, and the sweep is a minor part of a semicircle. Using the construction the fingers when projecting into the passage always occupy a position substantially normal to said passage. This results in minimum tearing and fracturing of the muffin sides and interior.

Another object is to provide a novel method for processing bakery goods such as muffins or buns, wherein they may be partially divided along a plane without fraying of their insides or outer skins, with the so-treated buns or muffins exhibiting relatively long shelf life.

Other objects and advantages are attained by the invention, and the same is described hereinbelow in conjunction with the accompanying drawings, wherein:

FIG. 3 is a view looking down at the top of the apparatus illustrated in FIG. 2;

FIG. 4 is a view, enlarged from the showings in FIGS. 2 and 3, showing piercing elements employed in the cutter means of the apparatus;

FIG. 5 is a section view taken along the line 5—5 in FIG. 4; and

FIGS. 6 and 7 show a typical muffin during and after processing.

Figure 1:
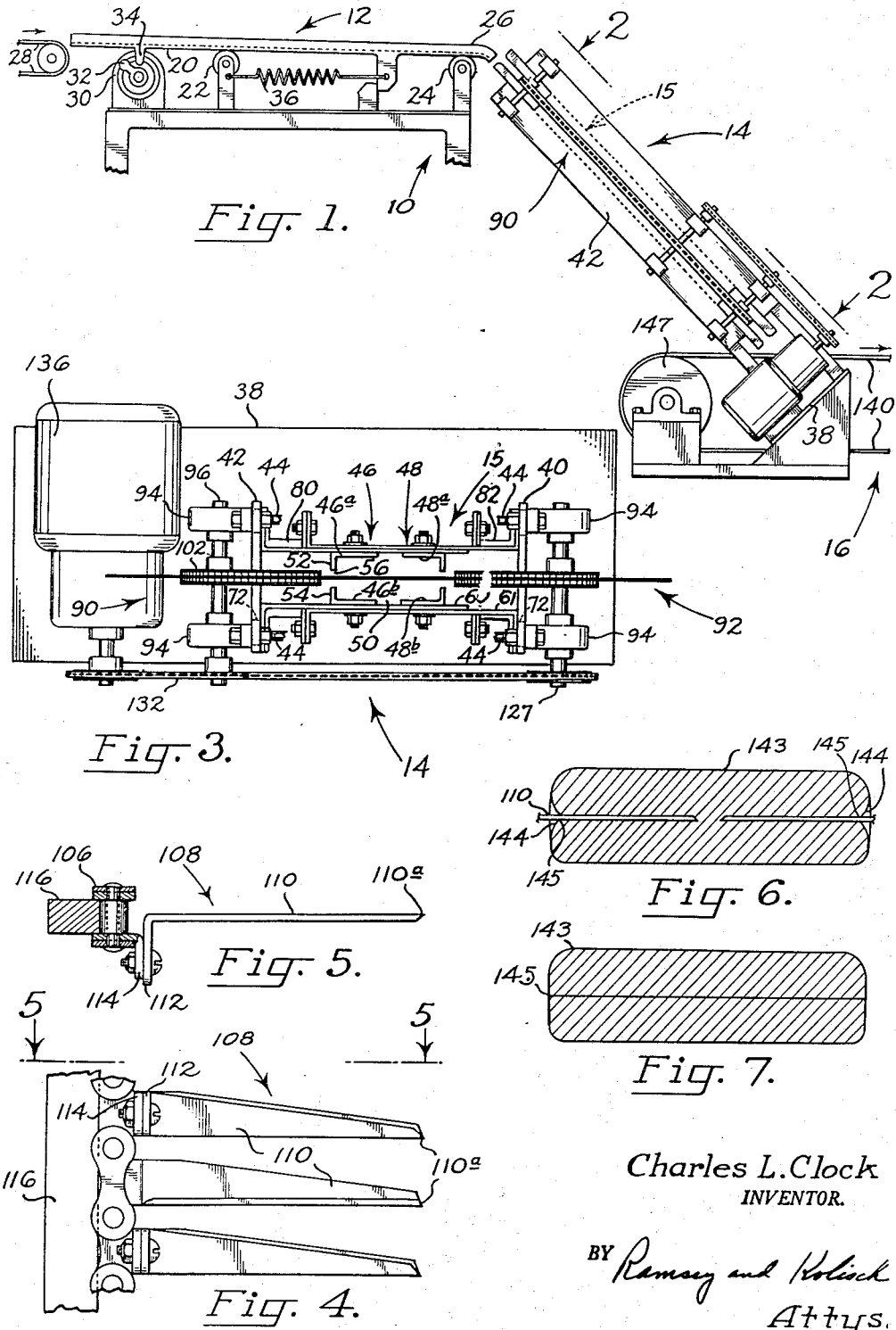
FIG. 1 is a side elevation view, somewhat simplified, of apparatus constructed according to this invention, showing a feed table, guide means at the discharge end of the feed table receiving products leaving the feed table and means operable to puncture the sides of products in said guide means, and an off-bearing conveyor at the discharge end of the guide means for removing treated products.

Referring now to the drawings, and in particular to FIG. 1, 10 indicates generally the frame of apparatus constructed according to this invention, such apparatus including at the left of the figure a feed table 12 for feeding goods such as muffins or buns into an elongated cutting station 14 including a confined guide structure or means 15. On traveling downwardly along guide means 15, the goods are punctured along opposite sides with elongated penetrations as will be described. Goods on leaving guide means 15 are deposited on an off-bearing conveyor, such as conveyor means 16, whence they may be transported to a packaging station and packaged for distribution.

Considering now details of the apparatus, feed means or table 12 comprises a substantially horizontally disposed support platform 20 supported on rollers 22, 24 that accommodate horizontal shifting to the right and the left in FIG. 1 of platform 20. Along the length of the support platform and on either side thereof are upstanding support flanges, such as flange 26 (the rear flange is obscured in FIG. 1). These flanges are laterally spaced a relatively large distance apart at the left end of support platform 20, and define at the left end a relatively wide mouth for the reception of goods such as muffins traveling in random fashion onto the support platform from a conveyor 28. The flanges converge laterally progressing from left to right, and operate to funnel muffins on platform 20 into an aligned position at the time they leave the right or discharge end of the feed table. Forward progress of muffins along the platform is produced by means that shifts the platform gradually from left to right, so that muffins are carried with it in this direction, and returns the platform sharply, with relative shifting of the muffins occurring by reason of their inertia. Thus, 30 indicates a motor turning at a relatively slow speed and in a clockwise direction in FIG. 1 a crank 32. At periodic intervals the crank engages an arm 34 secured to the feed table to shift the platform from left to right. On moving free of the arm, spring 36 returns the platform sharply with muffins being shifted relatively to the right on the platform.

Figure 2:
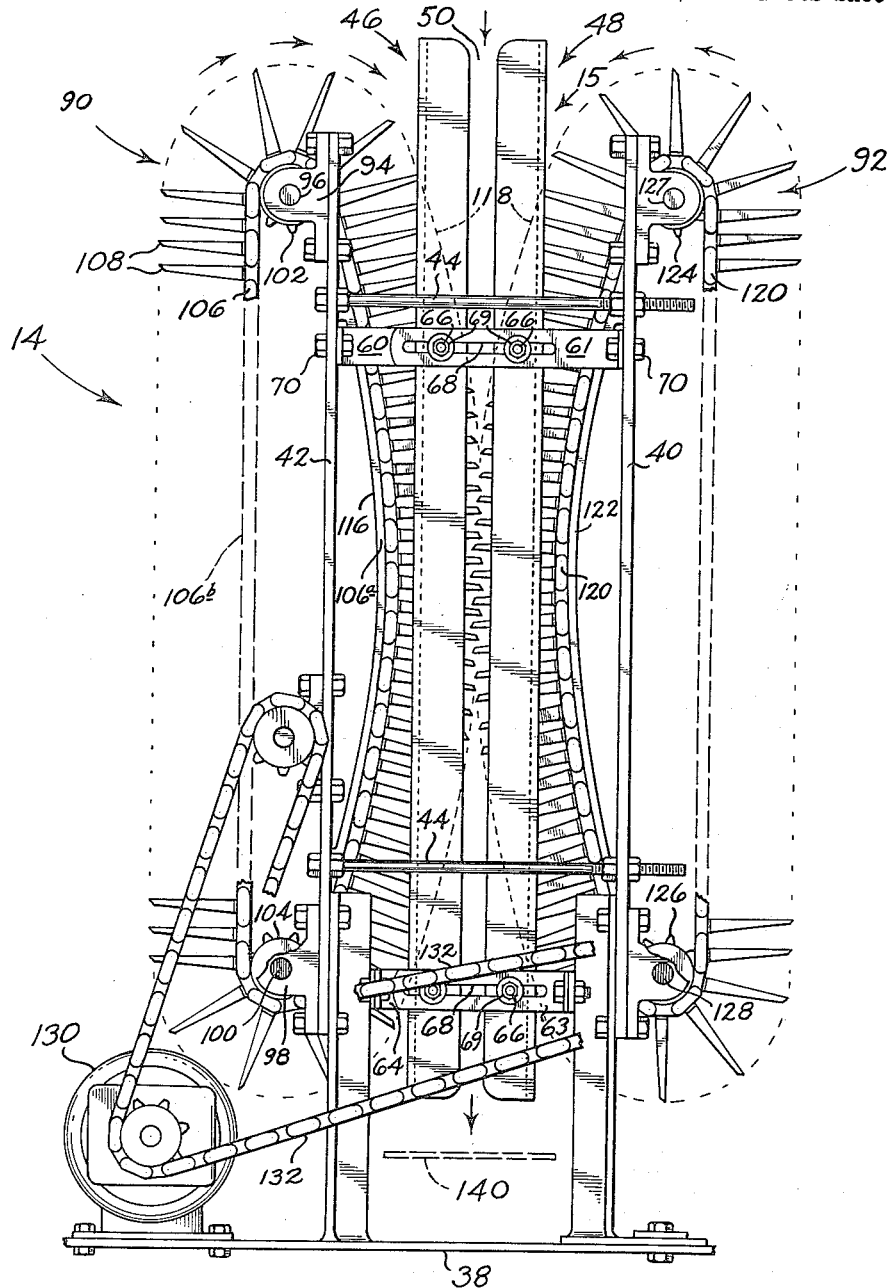
FIG. 2 is a view, taken along the line 2—2 in FIG. 1, and somewhat enlarged, and with parts broken away.

Considering now cutting station 14, and with reference now in particular to FIGS. 1, 2, and 3, affixed to an inclined base plate 38 of frame 10 are a pair of elongated standards 40, 42. These incline upwardly and to the left in FIG. 1, and mount guide means 15 that parallels the standards and extends thereinbetween. The standards are interconnected by tie rods 44.

Guide means 15 comprises generally two pairs of retainer members, one pair of retainer members being indicated at 46 and the other being indicated at 48. The pair indicated at 46 comprises a retainer member 46a and an oppositely disposed and laterally spaced retainer member 46b. Similarly, pair 48 comprises a retainer member 48a and an oppositely disposed and laterally spaced retainer member 48b. Retainer members 46a, 46b define one side and retainer members 48a, 48b define the other side of an elongated confined passage 50 extending downwardly between standards 40, 42. The two retainer members of each pair include inwardly projecting flanges (such as flanges 52, 54 for members 46a, 46b) that define an elongated opening (such as opening 56) extending longitudinally along the side of passage 50. These openings, as will be described, are relied upon to enable the movement into and out of the passage 50 of a cutter means that operates to puncture goods such as muffins disposed within passage 50.

In a bakery, different runs of muffins or buns may vary in size and shape, and means are provided for varying the lateral spacing of the retainer members of each pair, and for adjusting the spacing between the pairs of retainer members. Thus, the size of passage 50 can be changed so that for any given size of muffin or bun, it will be closely confined on moving through the passage.

Retainer members 46b, 48b (that define the underside of passage 50 in FIG. 3) adjacent their top set of ends are mounted on the standard through overlapped upper brackets 60, 61, and adjacent their bottom set of ends are mounted on the standards through overlapped lower brackets 63, 64. The connection of the retainer members with the brackets is made by screw studs 66 suitably affixed to the retainer members and inserted through accommodating slots 68. Loosening of nuts 69 on the screw studs permits shifting of members 46b, 48b either toward or away from each other. Upper brackets 60, 61 are secured to standards 40, 42 by nut and bolt assemblies 70 that connects the standards with turned-over end portions of the brackets. Slots 72 are formed in the standards, so that on loosening of the nut and bolt assemblies the upper brackets and the retainer members secured thereto may be shifted in the standards. Lower brackets 63, 64 are secured in a similar manner to the standards, permitting similar shifting of the lower set of ends of the retainer members.

The mounting for retainer members 46a, 48a defining the upper side of passage 50 in FIG. 3, is the same as that just described for members 46b, 48b. Thus, overlapped upper brackets 80, 82 mount the upper set of ends of retainer members 46a, 48a, and brackets similar to brackets 63, 64 (obscured in FIGS. 2 and 3) mount the lower set of ends. The distance between members 46a, 48a is changed by shifting the position of the members on the brackets, and members 46a, 46b are shifted on standards 40, 42 in the same manner as discussed in connection with retainer members 46b, 48b.

A pair of cutter means 90, 92 are provided for processing items such as muffins as they travel down inclined passage 50. One is mounted on the frame 10 along each side of the passage. The two cutter means are similar in construction, and only one is described in detail.

Thus, with reference to cutter means 90 at the left of passage 50 in FIGS. 2 and 3, secured adjacent the top end of standard 40 are bearings 94. These journal the ends of a sprocket shaft 96. Secured adjacent the bottom end of the standard are bearings 98 that journal the ends of a sprocket shaft 100. Affixed intermediate the ends of sprocket shafts 96, 100 are sprockets 102, 104, respectively. A continuous chain 106 is trained about these sprockets, and disposed along chain 106 and constituting a continuous run of fingers are plural piercing fingers 108.

Each finger (with reference to FIGS. 4 and 5) includes a blade element 110 which is elongated and narrow, and has a sharpened end 110a, and a turned-over end 112 secured to an ear 114 of a link in chain 106. When the chain is revolved on sprockets 102, 104, it serves to move fingers 108 in a path conforming to the outline for the fingers as shown in FIG. 2. A reach 106a of the chain is disposed directly adjacent the side of passage 50, and slides on an arcuate support or runner means 116. This constitutes a curving reach in the construction, and joining the ends of the curving reach is a straight or return reach 106b. The inner ends of the fingers over that portion of the chain that is a curving reach define a curved sweep that enters into and then withdraws from passage 50, as indicated by the dotted outline 118 in FIG. 2. The fingers project into passage 50 through the opening defined between flanges 52, 54. Sweep 118 curves over an arc that is a minor part of a semicircle (in the embodiment illustrated about one fourth), so that the fingers throughout the time that they project into passage 50 extend approximately normally to the path. The fingers, on movement of the chain, thus enter into and withdraw from passage 50, but do so with movement almost entirely confined to longitudinal movement, and with minimal lateral twisting or shifting. Thus, when the fingers enter a muffin, for instance, they almost entirely cut it by punching into the muffin and then directly withdrawing from it. The chain organization enables a mounting for the fingers whereby they may move in a sweep of relatively large radius without the cutter means protruding excessively to each side of the cutting station.

Cutter means 92, like cutter means 90, includes a chain 120 mounted in a similar manner, with fingers 108 on the chain moving in an arcuate sweep along a reach 120 of the chain supported on arcuate support 122. The chain is trained over sprockets 124, 126 mounted on sprocket shaft 127, 128, respectively.

Chains 106, 120 are revolved during operation of the machine with the curving reaches of the chains moving in the direction of the arrows in FIG. 2. Power-actuated means is provided for revolving the chains. In the form of the invention shown, this comprises a motor 130 and a drive chain 132.

Completing the description of the apparatus, off-bearing conveyor means 16 may take any of a number of forms. In the embodiment illustrated the conveyor means comprises a belt 140 trained over a pulley 142, and conventional power-operated means (not shown) is provided for revolving the belt with its upper run traveling from left to right in FIG. 1.

Explaining the operation of the apparatus, bakery goods preferably are processed soon after baking, preferably within about one or two hours, so that they are still flexible, resilient, and warm. The bakery goods, considered for explanation purposes to be muffins, travel along the feed table, and are funneled into alignment, and then are discharged at the right end of the feed table into passage 50 defined by the support members. On sliding down passage 50, they come into contact with the piercing fingers, and further forward progress of the muffins is controlled by movement of these fingers. These fingers are traveling downwardly along the sides of passage 50 at a speed corrsponding to the movement of chains 106, 120.

Each finger, on moving down passage 50, also first shifts into and then is pulled from passage 50. Any muffin in the vicinity of a finger is penetrated by the finger as a result of this in and out movement. Fingers contact the muffin from both sides, so that it tends to stay centered in passage 50 without being unduly compressed on any one side. On dropping onto conveyor 16, a muffin will have a series of deep penetrations cut therein, defining a plane dividing the muffin.

Referring to FIGS. 6 and 7, with the fingers entering a muffin 143 (as shown in FIG. 6), the skin of the muffin is indented slightly as at 144. The fingers pierce into and cut the skin as at 145, and cut the inside of the muffin, with a minimum of ripping, tearing and fraying of the muffin. After the fingers are withdrawn from the muffin, the just cut portions of the muffin move together, as shown in FIG. 7. The skin of the muffin returns to its original shape (flush with the muffin sides). The cuts 145 in the skin move together to form a relatively tight seal. It is this feature of piercing a warm and flexible bakery good and then withdrawing the piercing element so as to form a seal, that makes the apparatus of the invention so advantageous to bakers.

A particular embodiment of the invention has been described, that includes a pair of chains moving down the opposite sides of a single passage 50. It should be obvious that a greater number of passages could be added, operating side by side, in the event that greater capacity is desired, and that other changes could be made, in the form of feed table and off-bearing conveyor, and in the particular construction of the cutter means disclosed.

It is claimed and desired to secure by Letters Patent:

1. Apparatus for partially dividing bakery goods such as muffins and the like comprising a frame, means on the frame defining an elongated passage along which such goods are transported with elongated openings provided along opposite sides of said passage, and cutter means disposed along each side of said passage and protruding thereinto through said openings, each cutter means comprising plural piercing fingers spaced from each other along the length of said openings and means mounting the said fingers for movement along the length of said passage with said piercing fingers moving so as to penetrate into and then be withdrawn from goods in said passage.

2. Apparatus for partially dividing bakery goods such as muffins and the like comprising a frame, means on the frame defining an elongated substantially linear passage along which such goods are transported with an elongated opening provided along at least one side of said passage, and cutter means disposed along said one side of said passage and protruding thereinto through said opening, said cutter means comprising plural piercing fingers following one after another and disposed as a continuous run, a mounting for said run of fingers with the mounting supporting a portion of the run containing plural fingers whereby it extends in a curving reach adjacent an opening with inner ends of the fingers along said curving reach defining a curved sweep that enters into and then withdraws from said passage through the opening, said sweep curving over an arc that is a minor part of a semicircle and the fingers throughout said reach extending approximately normally to said passage, and power-operated means for revolving said continuous run of fingers.

3. The apparatus of claim 2 wherein the means mounting the plural piercing fingers comprises an elongated continuous and flexible chain, and support means for the chain training a portion of the chain in a curving reach disposed adjacent but outside said passage and wherein the piercing fingers along said portion of the chain extend from the chain inwardly into said passage.

4. The apparatus of claim 2 wherein there are elongated openings along opposite sides of said passage, and there is a cutter means disposed along each of said opposite sides protruding into the passage through an opening with one cutter means substantially directly opposed to the other.

5. The apparatus of claim 4 wherein the means mounting the plural piercing fingers comprises an elongated continuous and flexible chain, and support means for the chain training a portion of the chain in a curving reach disposed adjacent but outside said passage and wherein the piercing fingers along said portion of the chain extend from the chain inwardly into said passage.

6. Apparatus for partially dividing bakery goods such as muffins and the like comprising a frame; a pair of opposed, laterally spaced-apart retainer members mounted on said frame defining one side and another pair of opposed, laterally spaced-apart retainer members spaced from the first-mentioned pair defining an opposite side of an elongated confined passage for the travel of such goods; edge portions of said retainer members of the first-mentioned pair defining an elongated space between the members extending longitudinally thereof and edge portions of the other pair of retainer members defining an elongated space between the members extending longitudinally thereof and defining with the first elongated space a common plane; a movable cutter means mounted on said frame adjacent each elongated space and each including plural piercing fingers protruding into said passage through the elongated space constructed to penetrate and then be withdrawin from goods disposed in said passage on movement of the cutter means; means for adjusting the relative lateral spacing of the retainer members of each pair; and means for adjusting the relative spacing of the two pairs of retainer members.

7. Apparatus for partially dividing bakery goods such as muffins and the like comprising a frame, means on the frame defining an elongated passage along which such goods are transported and defining an elongated opening along at least one side of said passage, an elongated continuous chain, means mounting the chain adjacent said one side of said passage with the chain extending in a curving reach disposed directly adjacent but outside said passage and returning in reach disposed close to said curving reach but outwardly of said passage from said curving reach, plural piercing fingers mounted one after another on said chain and with the fingers along said curving reach of the chain projecting toward said passage and with inner ends of the fingers along said curving reach defining a sweep that enters into and then withdraws from said passage, said sweep curving over an arc that is a minor part of a semicircle and the fingers throughout said curving reach extending approximately normally to said passage, and means for revolving said chain and with the chain the fingers on the chain.

8. Apparatus for partially dividing bakery goods such as muffins and the like comprising a frame, a feed table with feed and discharge ends mounted on the frame and means for advancing bakery goods along said feed table toward its discharge end, elongated sloping guide means for receiving goods discharged at said discharge end of the feed table and defining a closed downwardly sloping passage for such goods, said guide means having means defining openings along opposed lateral sides of said passage, a pair of endless chains and means mounting the chains with one adjacent one and one adjacent the other of said opposed lateral sides, the means mounting each chain including a curved runner means curving over an arc that is a minor portion of a semicircle and supporting the chain with an elongated reach of the chain substantially paralleling the side of said passage adjacent the chain, plural piercing fingers mounted one after another on each chain, said reach of each chain having plural fingers with inner ends defining a sweep that enters into and then withdraws from said passage through one of said openings in a side of said passage and the fingers on said reach extending substantially normally to said passage, and power-operated means for revolving each chain and the fingers on the chain with the fingers moving downwardly along said curved runner means.

9. A method of partially dividing a bakery good such as a muffin and the like comprising puncturing the bakery good, while it travels along a longitudinal path, piercing a bakery good by an agency moving synchronously therewith and while the bakery good is freshly made and still flexible and resilient, to produce therein plural elongated penetrations disposed in a plane that divides the bakery good, each of said penetrations being prepared through the steps of first piercing the outer surface of the good, and then injecting into and thence retracting from the body of the bakery good a piercing agency moved primarily in a path paralleling the penetration and with a minimum of lateral movement of said agency adjacent the surface of the good, and allowing the pierced surface of the good to close itself on retraction of the piercing agency with such closing occurring because of the resilient and flexible nature of the good.

10. A method of partially dividing a bakery good such as a muffin and the like comprising puncturing the bakery good, while it travels along a longitudinal path, piercing a bakery good by an agency moving synchronously therewith and while the bakery good is freshly made and still flexible and resilent, from opposite sides of the bakery good to produce therein plural elongated penetrations extending inwardly from opposed sides that define a plane dividing the bakery good, each of said penetrations being prepared through the steps of first piercing the outer surface of the good, and then injecting into and then retracting from the body of the good a piercing agency moved primarily in a path paralleling the penetration and with a minimum of lateral movement of the agency adjacent the surface of the good, and allowing the pierced surface of the good to close itself on retraction of the piercing agency with such closing occurring because of the resilient and flexible nature of the good.

11. A method of partially dividing a bakery good such as a muffin and the like comprising piercing the bakery good, while it travels along a longitudinal path, by an agency moving synchronously therewith and while the bakery good is freshly made and still flexible and resilient, to produce therein plural elongated penetrations disposed in a plane that divides the bakery good, each of said penetrations being prepared through the steps of first piercing the outer surface of the good, and then injecting into and thence retracting from the body of the bakery good a piercing agency moved primarily in a path paralleling the penetration and with a minimum of lateral movement of said agency adjacent the surface of the good, and allowing the pierced surface of the good to close itself on retraction of the piercing agency with such closing occurring because of the resilient and flexible nature of the good.

12. A method of partially dividing a bakery good such as a muffin and the like comprising piercing the bakery good from opposite sides thereof, while it travels along a longitudinal path, by an agency moving synchronously therewith and while the bakery good is freshly made and still flexible and resilient, to produce therein plural elongated penetrations extending inwardly from opposed sides that define a plane dividing the bakery good, each of said penetrations being prepared through the steps of first piercing the outer surface of the good, and then injecting into and then retracting from the body of the good a piercing agency moved primarily in a path parallelling the penetration and with a minimum of lateral movement of the agency adjacent the surface of the good, and allowing the pierced surface of the good to close itself on retraction of the piercing agency with such closing occurring because of the resilient and flexible nature of the good.

References Cited by the Examiner

UNITED STATES PATENTS

| 2,220,270 | 11/40 | Page | 225—96 X |
| 2,582,636 | 1/52 | Kruse et al. | 146—73 X |
| 2,989,228 | 6/61 | Glattli | 83—51 X |

FOREIGN PATENTS

| 95,690 | 3/39 | Sweden. |
| 145,284 | 3/54 | Sweden. |

J. SPENCER OVERHOLSER, *Primary Examiner.*

JOHN C. MacNAB, CARL W. ROBINSON, *Examiners.*